United States Patent
Enomoto et al.

(10) Patent No.: US 6,255,390 B1
(45) Date of Patent: Jul. 3, 2001

(54) POLYOLEFIN TYPE RESINOUS COMPOSITION

(75) Inventors: Takehiko Enomoto; Chikashi Okayama, both of Chiba (JP)

(73) Assignee: Chisso Corporation, Osaka (JP)

(*) Notice: Subject to any disclaimer, the term of this patent is extended or adjusted under 35 U.S.C. 154(b) by 0 days.

(21) Appl. No.: 09/402,788

(22) PCT Filed: Mar. 12, 1998

(86) PCT No.: PCT/JP98/01041
§ 371 Date: Oct. 12, 1999
§ 102(e) Date: Oct. 12, 1999

(87) PCT Pub. No.: WO98/46680
PCT Pub. Date: Oct. 22, 1998

(30) Foreign Application Priority Data

Apr. 16, 1997 (JP) .................................... 9/114313
May 16, 1997 (JP) .................................... 9/143531

(51) Int. Cl.⁷ .................................................. C08L 53/00
(52) U.S. Cl. ................................................................ 525/88
(58) Field of Search ................................ 524/505; 525/88

(56) References Cited

U.S. PATENT DOCUMENTS

| 5,308,908 | * | 5/1994 | Fukui | 524/451 |
| 5,543,454 | * | 8/1996 | Kamakura | 524/451 |
| 5,965,654 | * | 10/1999 | Hirata | 524/451 |
| 6,034,177 | * | 3/2000 | Sobajima | 525/88 |

FOREIGN PATENT DOCUMENTS

| 0 593 221 | 4/1994 | (EP) . |
| 0 695 781 | 2/1996 | (EP) . |
| 0 700 943 | 3/1996 | (EP) . |
| 8-27238 | 1/1996 | (JP) . |
| 8-183412 | 7/1996 | (JP) . |
| 9-194553 | 7/1997 | (JP) . |

* cited by examiner

*Primary Examiner*—Paul R. Michl
(74) *Attorney, Agent, or Firm*—McDermott, Will & Emery

(57) ABSTRACT

A polyolefin type resinous composition comprising 99 to 80% by weight of a propylene type block copolymer [A] and 1 to 20% by weight of an ethylene type or styrene type elastomer [B] which being superior in a transparency, a coloring property and a dimensional stability is provided.

The said polyolefin composition comprises the said [A] consisting of a propylene homopolymer component and an ethylene propylene copolymer component having respective limiting viscosities: $[\eta]_{PP}$, $[\eta]_{RC}$, weight %: $W_{PP}$, $W_{RC}$, and melt flow rates: $[MFR]_{PP}$, $[MFR]_{RC}$, as well as the said [B] having a limiting viscosity: $[\eta]_R$ and a melt flow rate: $[MFR]_R$, in such a way that the following relationships being established;

$([\eta]_{RC}/[\eta]_{PP}) \times (W_{PP}/W_{RC}) = 0.2-3.0$, $([MFR]_{RC}/[MFR]_{PP}) = 0.3-4.0$, $[\eta]_{RC}/[\eta]_{PP} = 0.7-1.2$, $[\eta]_{RC} > 6.5$, $[MFR]_R/[MFR]_{PP} = 0.3-4$, and $[\eta]_R/[\eta]_{PP} = 0.7-1.2$.

6 Claims, No Drawings

POLYOLEFIN TYPE RESINOUS COMPOSITION

TECHNICAL FIELD

This invention relates to a polyolefin type resinous composition which is superior in a transparency, a coloring property when pigment(s) being added and a dimensional stability.

BACKGROUND ART

Moldings made with use of polypropylenes (propylene homopolymer, ethylene-propylene copolymer, ethylene-propylene block copolymer) are relatively superior in an economical efficiency and have been used for wide fields. However, moldings made with use of propylene homopolymer have a high rigidity but have a disadvantage of a poor impact resistance, particularly a poor impact resistance at a low temperature. Thus, there have been hitherto made many propositions in order to improve an impact resistance at a low temperature.

In those propositions, propylene type block copolymers have been prepared generally by forming at first homopolymer components and then introducing ethylene-propylene random copolymer components. Since moldings made with use of propylene type block copolymers are superior in an impact resistance at a low temperature, they are used widely in various industrial fields such as automobiles and household electric appliances.

However, moldings made with use of conventional propylene type block copolymers are superior in an impact resistance but they have no transparency, thus they have such a disadvantage that they are not colored well when various pigments being added and they have such an additional disadvantage that a dimensional stability is bad.

DISCLOSURE OF THE INVENTION

We inventors made extensive researches with an object to solve the above-mentioned problems, to attain a polyolefin type resinous composition which is superior in a transparency, a coloring property when pigment(s) being added and a dimensional stability by controlling a product of a polymerization forming ratio of a homopolymer component to a copolymer component and a respective limiting viscosity ratio within a specified range, furthermore controlling a ratio of a melt flow rate of a homopolymer component to a melt flow rate of an ethylene-propylene copolymer component, and furthermore controlling a ratio of a melt flow rate of the homopolymer component in the propylene type block copolymer composition [A] to a melt flow rate of the olefin type or styrene type elastomer ($[MFR]_R/[MFR]_{PP}$) as well as a ratio of a limiting viscosity of the homopolymer component in the propylene type block copolymer composition [A] to a limiting viscosity of the olefin type or styrene type elastomer ($[\eta]_R/[\eta]_{PP}$) in a propylene type block copolymer composition [A] obtained by forming a homopolymer in gaseous phase polymerization and thereafter polymerizing an ethylene-propylene copolymer component.

As clear from the above-mentioned explanation, the object of the present invention is to provide a polyolefin type resinous composition which is superior in a transparency, a coloring property when pigment(s) being added and a dimensional stability.

The present invention has the following constructions.

(1) A polyolefin type resinous composition comprising 99~80% by weight of a propylene type block copolymer [A] wherein the said block copolymer consists of a propylene homopolymer component and an ethylene-propylene copolymer component, a product of a limiting viscosity ratio of the said copolymer component to the said homopolymer component and a weight ratio of the said homopolymer component to the said copolymer component is within a range of $$(([\eta]_{RC}/[\eta]_{PP}) \times (W_{PP}/W_{RC})) = 0.2 \sim 3.0,$$

wherein a limiting viscosity of the said homopolymer component being $[\eta]_{PP}$, a limiting viscosity of the said copolymer component being $[\eta]_{RC}$, a weight of the said homopolymer component being $W_{PP}$ and a weight of the said copolymer component being $W_{RC}$, as well as a ratio of a melt flow rate of the said homopolymer component to a melt flow rate of the said copolymer component is within a range of $$([MFR]_{RC}/[MFR]_{PP}) = 0.3 \sim 4.0,$$

a ratio of a limiting viscosity in the said homopolymer component to the said copolymer component is within a range of $$[\eta]_{RC}/[\eta]_{PP} = 0.7 \sim 1.2,$$

and $[\eta]_{RC}$ of the said copolymer component is 6.5 or less, and 1~20% by weight of an ethylene type or styrene type elastomer [B] wherein a ratio of a melt flow rate of the homopolymer component in the said propylene type block copolymer [A] to a melt flow rate of the latter mentioned olefin type or styrene type elastomer is within a range of $$([MFR]_R/[MFR]_{PP}) = 0.3 \sim 4,$$

and a ratio of a limiting viscosity $[\eta]_{PP}$ in the homopolymer component in the said propylene type block copolymer [A] to a limiting viscosity of the latter mentioned olefin type or styrene type elastomer $[\eta]_R$ is within a range of $$[\eta]_R/[\eta]_{PP} = 0.7 \sim 1.2.$$

(2) A polyolefin type resinous composition according to the above-mentioned (1) wherein the copolymer component in the propylene type block copolymer (A) contains an ethylene weight unitof 25~55% by weight based on the copolymer component weight.

(3) A polyolefin type resinous composition according to the above-mentioned (1) wherein the propylene type block copolymer (A) contains a copolymer component of 22~70% by weight based on the weight.

(4) A polyolefin type resinous composition according to the above-mentioned (1) wherein the olefin type or styrene type elastomer [B] is ethylene-butene rubber.

(5) A polyolefin type resinous composition comprising 100 parts by weight of the polyolefin type resinous composition according to the above-mentioned (1) to (4) and 0.001~0.1 parts by weight of a molecular weight decreasing agent (C).

BEST MODE FOR CARRYING OUT THE INVENTION

The invention is illustrated as follows.

Necessary conditions of the propylene type block copolymer composition [A] used in the invention are that a relationship formula between contents and respective limiting viscosities in the homopolymer component and the copolymer component $([\eta]_{RC}/[\eta]_{PP}) \times (W_{PP}/W_{RC})$ is within a range of 0.2~3.0, more preferably 0.3~2.7, that a ratio of a melt flow rate of the said homopolymer component to a melt flow rate of the said copolymer component. ([MFR]$_{RC}$/[MFR]$_{PP}$) is within a range of 0.3~4, more preferably 0.3~3.5, that a limiting viscosity of the copolymer component [η]$_{RC}$ is 6.5 or less, more preferably 5.0 or less, and that a ratio of a limiting viscosity ratio of the homopolymer component to a limiting viscosity of the copolymer component, [η]$_{ER}$/[η]$_{PP}$, is within a range of 0.7~1.2, preferably 0.8~1.2.

Furthermore, the olefin type or styrene type elastomer has a ratio of a melt flow rate of the homopolymer component in the propylene type block copolymer composition [A] to a melt flow rate of the olefin type or styrene type elastomer ([MFR]$_{R}$/[MFR]$_{PP}$) is within a range of 0.3~4, more preferably 0.3~3.5, and a ratio of a limiting viscosity ratio of the homopolymer component of the propylene type block copolymer composition [A] to a limiting viscosity of the olefin type or styrene type elastomer ([η]$_{R}$/[η]$_{PP}$) is within a range of 0.3~4, more preferably 0.3~3.5, from a viewpoint of a transparency in the obtained resinous composition.

A copolymer component content of the said propylene type block copolymer composition [A] is preferably within a range of 22~70% by weight, more preferably 23~55% by weight, from viewpoints of a transparency and dimensional a stability in the obtained resinous composition as well as from an economical viewpoint due to superior flowability in the formed powders during preparation of the said propylene type block copolymer composition [A].

An ethylene content in the said copolymer component is preferably within a range of 25~55% by weight, more preferably 30~55% by weight, from a viewpoint of a transparency in the obtained resinous composition.

As to the propylene type block copolymer composition [A] used in the invention, a crystalline homopolymer component is prepared at first, which is determined directly about a limiting viscosity ([η]$_{PP}$) and a melt flow rate (MFR$_{PP}$). Describing as to a determination method of a limiting viscosity ([η]$_{RC}$) in the copolymer component, that is, the propylene-ethylene random copolymer formed subsequently, at first a limiting viscosity [η]$_{PP}$ of the obtained total propylene type block copolymer composition [A] is determined, then a product of a homopolymer component weight ratio and a limiting viscosity [η]$_{PP}$ of the homopolymer component is substracted from a limiting viscosity of the total composition ([η]$_{WHOLE}$), and the obtained value is divided by a ratio of the total composition, i.e. the copolymer component, to give a quotient, which is a limiting viscosity [η]$_{RC}$ of the copolymer part. That is, it is calculated by the following formula (1).

$$[\eta]_{RC} = \frac{[\eta]_{WHOLE} - (1 - W_{RC}/100)\,[\eta]_{PP}}{W_{RC}/100} \qquad \text{formula (1)}$$

Furthermore, a melt flow rate of the above-mentioned copolymer component (MFR$_{RC}$) is obtained by determining a melt flow rate of the total copolymer composition (MFR$_{WHOLE}$) and a melt flow rate of the homopolymer (MFR$_{PP}$) and then calculating by the following formula (2).

$$\text{Log}(MFR_{RC}) = \frac{\text{Log}(MFR_{WHOLE}) - (1 - W_{RC}/100)\text{Log}(MFR_{PP})}{W_{RC}/100} \qquad \text{formula (2)}$$

The copolymer component ratio (W$_{RC}$/100) in the formulae can be obtained by means of conventional known methods such as an infrared analytic method etc.

The propylene type block copolymer composition [A] used in the invention may be obtained by any method.

For example, blends obtained by adding and mixing homopolymers with EPR having a limiting viscosity ratio defined in the invention may be used. Furthermore, blends obtained by adding and mixing homopolymers and ethylene-propylene random copolymers polymerized with use of a titanium-containing solid catalyst component may be used. However, a method to polymerize a homopolymer component at first and then continuously prepare a copolymer component is most preferable from an economical viewpoint.

The olefin type or styrene type elastomers [B] used in the invention are elastomers showing a low crystallinity or an amorphousness, and they may be exemplified by ethylene-propylene rubber, ethylene-butene rubber, propylene-butene rubber, styrene-ethylene-butadiene rubber, styrene-ethylene-propylene rubber and hydrogenated styrene-butadine rubber etc.

As to the olefin type or styrene type elastomer [B] used in the invention, an ethylene content is preferably 40~90% by weight, more preferably 70~80% by weight in the ethylene type elastomer, a propylene content is preferably 40~90% by weight, more preferably 70~80% by weight in the propylene type elastomer, and a styrene content is preferably 40~90% by weight, more preferably 70~80% by weight in the styrene type elastomer, from viewpoints of a rigidity, and MFRR is preferably 25 g/10 min or less from a viewpoint of an impact resistance in the obtained composition.

An amount of the said olefin or styrene type elastomer [B] added is preferably 1~20 parts by weight from viewpoints of a rigidity, an impact resistance and an appearance in the obtained composition.

As the molecular weight decreasing agent (C) used in the invention according to the above-mentioned (5), organic peroxides are illustrated by example, and concretely the followings may be exemplified: benzoyl peroxide, t-butyl perbenzoate, t-butyl peracetate, t-butyl peroxyisopropyl carbonate, 2,5-di-methyl-2,5-di-(t-benzoylperoxy)hexane, 2,5-di-methyl-2,5-di-(t-benzoylperoxy)hexyne-3, t-butyl-diperadipate, t-butylperoxy-3,5,5-trimethyl hexanoate, methyl-ethyl ketone peroxide, cyclohexanone peroxide, di-t-butyl peroxide, dicumyl peroxide, 2,5-di-methyl-2,5-di-(t-butylperoxy)hexane, 2,5-di-methyl-2,5-di-(t-butylperoxy)hexyne-3, 1,3-bis-(t-butylperoxyisopropyl)benzene, t-butyl cumyl peroxide, 1,1-bis-(t-butylperoxy)-3,3,5-trimethyl cyclohexane, 1,1-bis-(t-butylperoxy)cyclohexane, 2,2-bis-(t-butylperoxybutane, p-menthane hydroperoxide, di-isopropyl benzene hydroperoxide, cumene hydroperoxide, t-butyl hydroperoxide, p-cymene hydroperoxide, 1,1,3,3-tetra-methyl butyl hydroperoxide and 2,5-di-methyl-2,5-di-(hydroperoxy)hexane. An amount of the molecular weight decreasing agent added is 0.001~0.1 parts by weight, preferably 0.01~0.05 parts by weight.

To the polyolefin type resinous compositions according to the invention, known additives used in the conventional polyolefins may be added if necessary. As the known additives, there may be exemplified an antioxidant, a dispersant, an ultraviolet absorber, a neutralizer, an antistatic agent, a pigment and a lublicant etc.

As preparation methods for the polyolefin type resinous compositions according to the invention, there may be exemplified methods for preparation by using the conventional known benders such as monoaxial or biaxial extruders, bambary mixers, kneaders or rolls etc.

Various moldings may be obtained by using the polyolefin type resinous composition according to the invention by means of various molding methods such as an injection molding, an extruding molding, a vacuum molding and an air pressure forming etc. as occasion demands, but an injection molding is preferable.

EMBODIMENTS

The following Examples and Comparative Examples illustrate the present invention more concretely, but the invention is not limited to them.

In the following Examples and Comparative Examples, the evaluation methods described below were carried out.

Evaluation Methods

♦ a melt flow rate

It was carried out according to a method defined in JIS K6758 at a determination temperature of 230° C. under a load of 2.16 kg. (unit: g/10 min)

♦ a coloring property 1 part by weight of a pearl pigment (made by Marl Corporation Co. Ltd.: mica pigment) was added to resinous compositions shown in Examples according to the invention or Comparative Examples to obtain moldings, which were evaluated by observing with the naked eye.

○: good pearl feeling

×: bad pearl feeling

♦ a haze test (transparency)

It was determined according to a method defined in JIS K7105 at a test piece thickness of 2 mm. (unit: %)

Transparency can be said good if a haze value (a cloudy value) being low.

♦ a coefficient of linear expansion (dimensional stability)

It was carried out according to a method defined in JIS K7197 at a temperature raising rate of 5° C./min under a load of 2 g and at a determination temperature of −30° C.~80° C. (unit: ×10$^{-5}$ cm/cm·° C.)

Dimensional stability can be said good if a coefficient of linear expansion being low.

Blending Components

●PP-1

Propylene type block copolymer having a melt flow rate (230° C., 2.16 kg load) of 6.0 g/10 min, an ethelene content in the copolymer component of 35%, a copolymer component content of 28.7%, $(\eta_{RC}/\eta_{PP}) \times (W_{PP}/W_{RC})$: 2.5, $MFR_{RC}/MFR_{PP}$: 1.1, $\eta_{RC}/\eta_{PP}$: 1.0, and $\eta_{RC}$: 1.8.

●PP-2

Propylene type block copolymer having a melt flow rate (230° C., 2.16 kg load) of 2.5 g/10 min, an ethylene content in the copolymer component of 48%, a copolymer component content of 36.7%, $(\eta_{RC}/\eta_{PP}) \times (W_{PP}/W_{RC})$: 1.8, $MFR_{RC}/MFR_{PP}$: 0.8, $\eta_{RC}/\eta_{PP}$: 1.1, and $\eta_{RC}$: 2.2.

●PP-3

Propylene type block copolymer having a melt flow rate (230° C., 2.16 kg load) of 7.5 g/10 min, an ethylene content in the copolymer component of 25%, a copolymer, component content of 50%, $(\eta_{RC}/\eta_{PP}) \times (W_{PP}/W_{RC})$: 1.2, $MFR_{RC}/MFR_{PP}$: 2.0, $\eta_{RC}/\eta_{PP}$: 0.9, and $\eta_{RC}$: 1.5.

●PP-4

Propylene type block copolymer having a melt flow rate (230° C., 2.16 kg load) of 8.7 g/10 min, an ethylene content in the copolymer component of 26%, a copolymer component content of 40.7%, $(\eta_{RC}/\eta_{PP}) \times (W_{PP}/W_{RC})$: 1.9, $MFR_{RC}/MFR_{PP}$: 0.6, $\eta_{RC}/\eta_{PP}$: 1.1, and $\eta_{RC}$: 1.6.

●PP-5

Propylene type block copolymer having a melt flow rate (230° C., 2.16 kg load) of g/10 min, an ethylene content in the copolymer component of %, a copolymer component content of %, $(\eta_{RC}/\eta_{PP}) \times (W_{PP}/W_{RC})$: 2.6, $MFR_{RC}/MFR_{PP}$: 1.0, $\eta_{RC}/\eta_{PP}$: 1.0, and $\eta_{RC}$: 2.1.

●PP-6

Propylene type block copolymer having a melt flow rate (230° C., 2.16 kg load) of 2.7 g/10 min, an ethylene content in the copolymer component of 46%, a copolymer component content of 24.4%, $(\eta_{RC}/\eta_{PP}) \times (W_{PP}/W_{RC})$: 5.0, $MFR_{RC}/MFR_{PP}$: 0.6, $\eta_{RC}/\eta_{PP}$: 1.6, and $\eta_{RC}$: 3.0.

●PP-7

Propylene type block copolymer having a melt flow rate (230° C., 2.16 kg load) of 7.61 g/10 min, an ethylene content in the copolymer component of 31%, a copolymer component content of 40.8%, $(\eta_{RC}/\eta_{PP}) \times (W_{PP}/W_{RC})$: 4.8, $MFR_{RC}/MFR_{PP}$: 0.1, $\eta_{RC}/\eta_{PP}$: 2.1, and $\eta_{RC}$:

● a molecular weight decreasing agent 1,3-bis(t-butyl-peroxyisopropyl)benzene

R-1

Ethylene-butene copolymer rubber having an ethylene content of 78% by weight and a melt flow rate of 5.8 g/10 min.

●R-2

Ethylene-butene copolymer rubber having an ethylene content of 75 % by weight and a melt flow rate of 0.7 g/10 min.

●R-3

Ethylene-butene copolymer rubber having an ethylene content of 78% by weight and a melt flow rate of 1.8 g/10 min.

●R-4

Ethylene-butene copolymer rubber having an ethylene content of 78% by weight and a melt flow rate of 0.4 g/10 min.

EXAMPLES 1 TO 10

Comparative Examples 1 to 8

As shown in Table-1 and Table-2 described below, a propylene type block copolymer (PP-1, PP-2, PP-3, PP-4, PP-5, PP-6, PP-7), a molecular weight decreasing agent and an olefin type elastomer (R-1, R-2, R-3, R-4) were blended to obtain a composition. Then, 100 parts by weight of the said composition, 0.1 parts by weight of a phenol type antioxidant and 0.1 parts by weight of calcium stearate were mixed in a high-speed stirring type mixer (Hensel Mixer, Trade name) at a room temperature for 3 minutes to obtain a composition, which was then granulated by using an extruding granulator (NVC-50 manufactured by Nakamichi Kikai) at a screw diameter of 50 mm and a cylinder setting temperature of 200° C. to obtain a composition in a pellet form.

The said composition was molded in an injection molding machine (IS-100 manufactured by Toshiba Kikai) under a clamping force of 100 t, at a cylinder temperature of 230° C., at an injection speed of 30 mm/second and a water passing temperature in a mold of 50° C. to make test pieces, which were then conditioned in a chamber at a humidity of 50% and a room temperature of 23° C. for 72 hours. Then, a melt flow rate, a haze test and a coefficient of linear expansion were evaluated and the results thereof are shown in Table-1 and Table-2.

As clear from Table-1 and Table-2, Examples 1 to 10 are superior in a transparency, a coloring property and a dimensional stability simultaneously compared to Comparative Examples 1 to 8.

INDUSTORIAL APPLICABILITY

Since the resinous compositions for trimming of automobiles according to the invention have an advantage to be superior in a transparency, a coloring property and a dimensional stability, they are useful as outer materials for automobiles such as bumpers, fenders, mauls and mud guards etc.

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| blending ratio of composition | | | | | | | | | | |
| PP-1 | 90 | 89.98 | | | | | | | | |
| PP-2 | | | 90 | 89.98 | | | | | | |
| PP-3 | | | | | 90 | 89.98 | | | | |
| PP-4 | | | | | | | 90 | 89.98 | | |
| PP-5 | | | | | | | | | 90 | 89.98 |
| molecular weight decreasing agent | | 0.02 | | 0.02 | | 0.02 | | 0.02 | | 0.02 |
| R-1 | 10 | 10 | 10 | 10 | 10 | 10 | 10 | 10 | | |
| R-2 | | | | | | | | | | |
| R-3 | | | | | | | | | 10 | 10 |
| R-4 | | | | | | | | | | |
| $[\eta]_{RC}/[\eta]_{PP} \times (W_{PP}/W_{RC})$ | 2.5 | 2.5 | 1.8 | 1.8 | 1.2 | 1.2 | 1.9 | 1.9 | 2.6 | 2.6 |
| $[MFR]_{RC}/[MFR]_{PP}$ | 1.1 | 1.1 | 0.8 | 0.8 | 2.0 | 2.0 | 0.6 | 0.6 | 1.0 | 1.0 |
| $[MFR]_{R}/[MFR]_{PP}$ | 1.0 | 1.0 | 1.8 | 1.8 | 0.9 | 0.9 | 0.6 | 0.6 | 1.0 | 1.0 |
| $[\eta]_{RC}/[\eta]_{PP}$ | 1.0 | 1.0 | 1.1 | 1.1 | 0.9 | 0.9 | 1.1 | 1.1 | 1.0 | 1.0 |
| $[\eta]_{R}/[\eta]_{PP}$ | 1.0 | 1.0 | 0.9 | 0.9 | 1.0 | 1.0 | 1.1 | 1.1 | 1.1 | 1.1 |
| $[\eta]_{RC}$ | 1.8 | 1.8 | 2.2 | 2.2 | 1.5 | 1.5 | 1.6 | 1.6 | 2.1 | 2.1 |
| evaluation results | | | | | | | | | | |
| melt flow rate | 6.1 | 18.0 | 3.1 | 10.7 | 7.0 | 23.0 | 7.8 | 24.9 | 1.8 | 9.0 |
| haze | 40 | 43 | 50 | 57 | 40 | 45 | 35 | 40 | 41 | 48 |
| coloring property | ○ | ○ | ○ | ○ | ○ | ○ | ○ | ○ | ○ | ○ |
| coefficient of linear expansion | 8.0 | 9.1 | 7.1 | 8.3 | 7.0 | 8.0 | 7.5 | 8.0 | 8.5 | 9.2 |

TABLE 2

| | Comparative Example | | | | | | | |
|---|---|---|---|---|---|---|---|---|
| | 1 | 2 | 3 | 4 | 5 | 6 | 7 | 8 |
| blending ratio of composition | | | | | | | | |
| PP-1 | | | 90 | | | | | |
| PP-4 | | | | | | 90 | | |
| PP-5 | | | | | | | | 90 |
| PP-6 | 90 | 89.98 | | | | | | |
| PP-7 | | | | 90 | 89.98 | | 90 | |
| molecular weight decreasing agent | | 0.02 | | | 0.02 | | | |
| R-1 | 10 | 10 | | | 10 | 10 | | |

TABLE 2-continued

| | Comparative Example | | | | | | | |
|---|---|---|---|---|---|---|---|---|
| | 1 | 2 | 3 | 4 | 5 | 6 | 7 | 8 |
| R-2 | | | 10 | | | 10 | | |
| R-3 | | | | | | | 10 | |
| R-4 | | | | | | | | 10 |
| $[\eta]_{RC}/[\eta]_{PP}) \times (W_{PP}/W_{RC})$ | 5.0 | 5.0 | 2.5 | 4.8 | 4.8 | 1.3 | 4.8 | 2.6 |
| $[MFR]_{RC}/[MFR]_{PP}$ | 0.6 | 0.6 | 1.1 | 0.1 | 0.1 | 0.6 | 0.1 | 1.0 |
| $[MFR]_{R}/[MFR]_{PP}$ | 1.7 | 1.7 | 1.0 | 0.4 | 0.4 | 0.05 | 0.4 | 1.0 |
| $[\eta]_{RC}/[\eta]_{PP}$ | 1.6 | 1.6 | 1.0 | 1.6 | 1.6 | 1.1 | 1.6 | 1.0 |
| $[\eta]_{R}/[\eta]_{PP}$ | 1.0 | 1.0 | 1.6 | 1.3 | 1.3 | 1.9 | 1.8 | 1.1 |
| $[\eta]_{RC}$ | 3.0 | 3.0 | 1.8 | 2.1 | 2.1 | 1.6 | 2.1 | 2.1 |
| evaluation results | | | | | | | | |
| melt flow rate | 3.0 | 11.3 | 3.2 | 7.1 | 23.8 | 23.8 | 5.5 | 1.3 |
| haze | 90 | 91 | 70 | 60 | 63 | 55 | 73 | 60 |
| coloring property | x | x | x | x | x | x | x | x |
| coefficient of linear expansion | 12.7 | 13.0 | 9.0 | 12.5 | 14.0 | 9.0 | 13.5 | 11 |

What is claimed is:

1. A polyolefin resin composition comprising:

(A) 99~80% by weight of a propylene block copolymer, wherein said block copolymer consists of a propylene homopolymer component and an ethylene-propylene copolymer component, and wherein a product of an intrinsic viscosity ratio of said copolymer component to said homopolymer component and a weight ratio of said homopolymer component to said copolymer component is within a range of $$((\eta_{RC}/\eta_{PP}) \times (W_{PP}/W_{RC})) = 0.2 \sim 3.0,$$

wherein the intrinsic viscosity of said homopolymer component and said copolymer component being $\eta_{PP}$ and $\eta_{RC}$, respectively, and a weight content (%) of said homopolymer and said copolymer component being $W_{PP}$ and $W_{RC}$, respectively, and having a ratio of a melt flow rate of said copolymer component ($MFR_{RC}$) to a melt flow rate of said homopolymer ($MFR_{PP}$) component within a range of $$(MFR_{RC}/MFR_{PP}) = 0.3 \sim 4.0,$$

a ratio of the intrinsic viscosity of said copolymer component to said homopolymer component is within a range of $$\eta_{RC}/\eta_{PP} = 0.7 \sim 1.2,$$

and wherein $\eta_{RC}$ is 6.5 or less, $W_{RC}$ is within a range of 22–70% by weight and the ethylene content of said copolymer component is within the range of 25–55% by weight; and (B) 1~20% by weight of an olefin or styrene elastomer, wherein a ratio of a melt flow rate of said olefin or styrene elastomer ($MFR_R$) to that of said homopolymer component ($MFR_{PP}$) in said propylene block copolymer (A) is within a range of $$(MFR_R/MFR_{PP}) = 0.3 \sim 4.0,$$

and a ratio of an intrinsic viscosity of said olefin or styrene elastomer $\eta_R$ to that of the homopolymer component $\eta_{PP}$ in said propylene block copolymer (A) is within a range of $$\eta_R/\eta_{PP} = 0.7 \sim 1.2.$$

2. A polyolefin resin composition according to claim 1 wherein the olefin or styrene elastomer (B) is an ethylene-butene rubber.

3. A polyolefin resin composition according to claim 1 wherein MFR of the propylene block copolymer is with in a range of 2.5 to 8.7 g/10 min.

4. A polyolefin resin composition comprising 100 parts by weight of the polyolefin resin composition according to claim 1 and 0.001~0.1 parts by weight of a molecular weight decreasing agent (C).

5. A polyolefin resin composition comprising 100 parts by weight of the polyolefin resin composition according to claim 2 and 0.001~0.1 parts by weight of a molecular weight decreasing agent (C).

6. A polyolefin resin composition comprising 100 parts by weight of the polyolefin resin composition according to claim 3 and 0.001~0.1 parts by weight of a molecular weight decreasing agent (C).

* * * * *